United States Patent
Wu et al.

(10) Patent No.: US 7,752,771 B2
(45) Date of Patent: Jul. 13, 2010

(54) DEPTH CHECKING DEVICE

(75) Inventors: Ji-Ping Wu, Shenzhen (CN);
Chung-Yuan Chen, Taipei Hsien (TW);
Long-Fong Chen, Taipei Hsien (TW);
Shi-Xin Xiao, Shenzhen (CN); Shi-Bin Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 21 days.

(21) Appl. No.: 12/340,757

(22) Filed: Dec. 22, 2008

(65) Prior Publication Data
US 2009/0313842 A1    Dec. 24, 2009

(30) Foreign Application Priority Data
Jun. 18, 2008    (CN) .......................... 200810302173

(51) Int. Cl.
G01B 5/18    (2006.01)
G01B 3/28    (2006.01)

(52) U.S. Cl. .......................................... 33/836; 33/542

(58) Field of Classification Search .................... 33/836, 33/501.08, 501.45, 542, 542.1; 73/866.5
See application file for complete search history.

(56) References Cited

U.S. PATENT DOCUMENTS

| | | | | |
|---|---|---|---|---|
| 716,279 A * | 12/1902 | Rieffel | .......................... | 33/836 |
| 750,449 A * | 1/1904 | Gillard | .......................... | 33/836 |
| 1,248,340 A * | 11/1917 | Kinney | .......................... | 33/836 |
| 2,650,435 A * | 9/1953 | Kidd | .......................... | 33/836 |
| 3,352,018 A * | 11/1967 | Mazeika | .......................... | 33/836 |
| 4,314,406 A * | 2/1982 | Barnes | .......................... | 33/542 |
| 4,321,752 A * | 3/1982 | Kaufman | .......................... | 33/512 |
| 5,189,808 A * | 3/1993 | Evans et al. | .......................... | 33/836 |
| 5,235,988 A * | 8/1993 | Johnson et al. | .......................... | 600/587 |
| 5,758,433 A * | 6/1998 | Alberts | .......................... | 33/836 |
| 6,694,832 B1 * | 2/2004 | Gleeson | .......................... | 73/866.5 |
| 6,698,105 B2 * | 3/2004 | Shen et al. | .......................... | 33/836 |
| 7,216,441 B2 * | 5/2007 | Batora | .......................... | 33/836 |

* cited by examiner

*Primary Examiner*—Christopher W Fulton
(74) *Attorney, Agent, or Firm*—Frank R. Niranjan

(57) ABSTRACT

A depth checking device includes a body member, a pressing member, a checking member and an adjustment nut. The body member defines a stepped through hole forming a stopping surface inside. The pressing member includes a first end and an opposite second end. The first end includes a first end surface defining a first opening. The second end defines a second opening. The checking member is mounted in the stepped through hole and includes an indication end adjacent to the first end and a probe end. The indication end includes a second end surface. The adjustment nut is screwed on the checking member and supported by the stopping surface in a position where the first end surface is coplanar with the second end surface and the probe end protrudes from the body member with a protruding length of the probe end same as a designed depth of a fixing hole.

7 Claims, 7 Drawing Sheets

DEPTH CHECKING DEVICE

BACKGROUND

1. Technical Field

The present disclosure relates to depth checking technology, and particularly, to a depth checking device for checking a workpiece depth.

2. Description of the Related Art

Generally, fixing holes, having a designed depth, are defined in a plastic workpiece for receiving a plurality of fixing nuts. Each fixing nut is received in a corresponding fixing hole in an interference fit. Another workpiece can be connected to the plastic workpiece by extending a screw through the fixing hole and engaging it with the corresponding fixing nut. Because of various reasons, such as the accumulation of plastic material, the depth of the fixing hole may not be the same as the designed depth. Therefore, a poor fit may exist between the plastic workpiece and the other workpiece.

To arrest this problem, the depth of the fixing hole is checked with a ruler or by direct visual inspection after assembly of the fixing nut. However, these methodologies are inefficient and often inaccurate.

Therefore, what is needed, is to provide a depth checking device, which checks the depth of the fixing hole efficiently and accurately.

DETAILED DESCRIPTION

Figure 1:
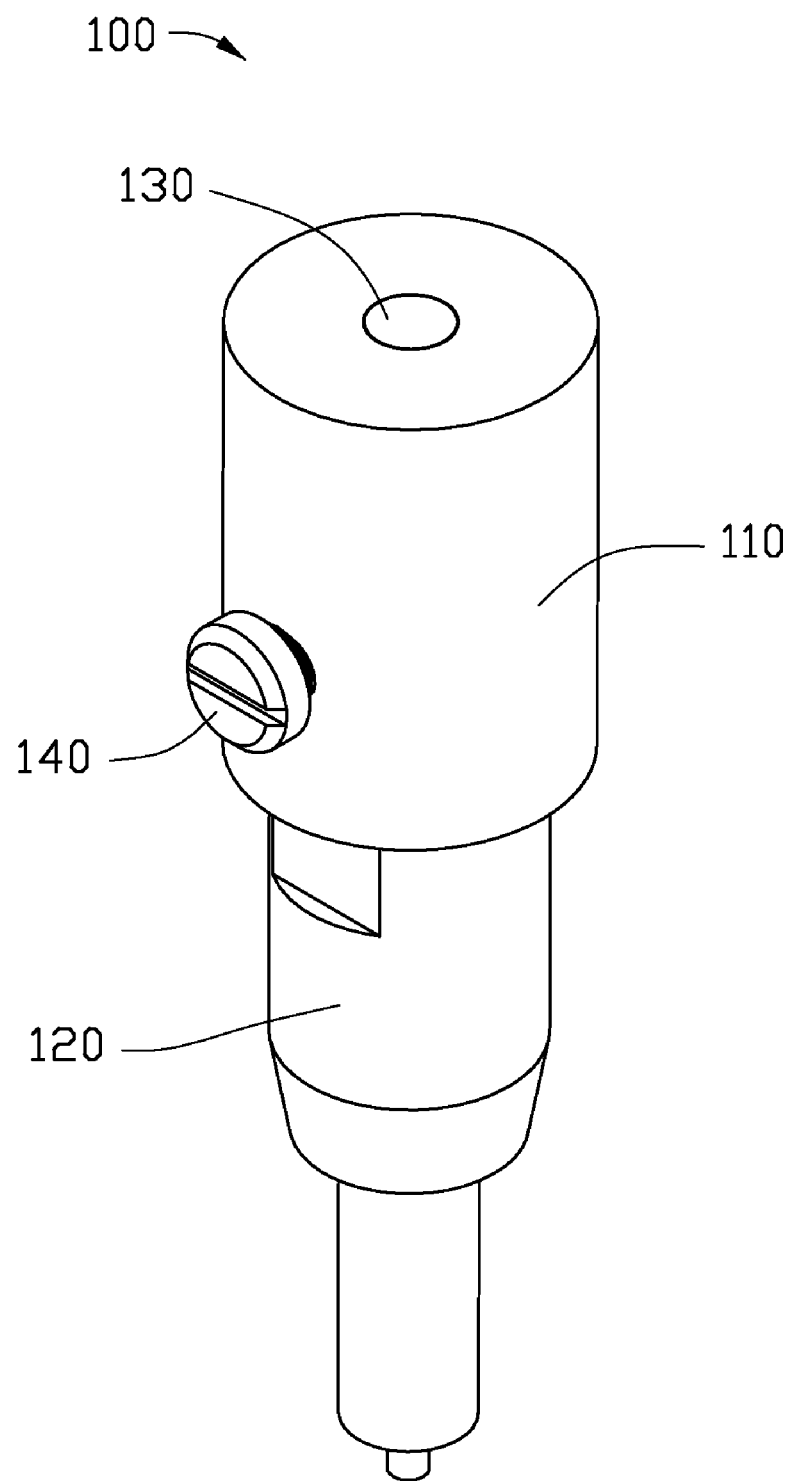
FIG. 1 is an isometric view of a depth checking device according to an exemplary embodiment.
Figure 2:
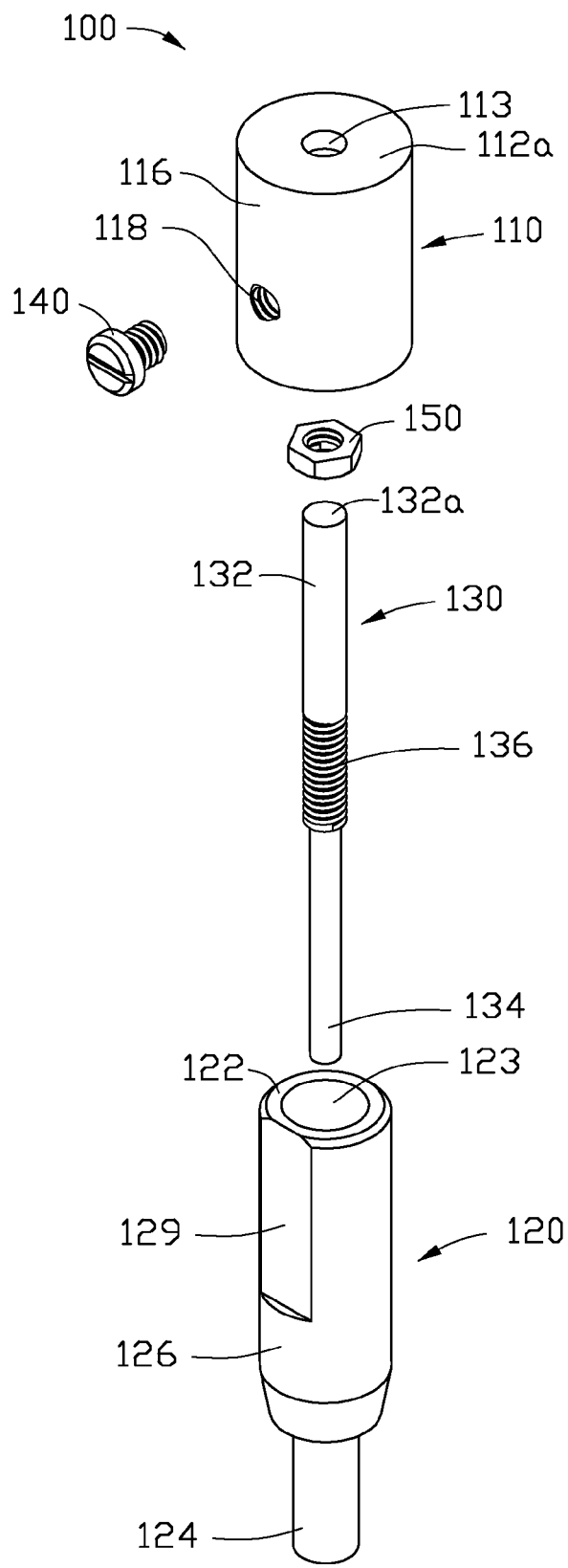
FIG. 2 is an exploded view of the depth checking device of FIG. 1.

Referring to FIGS. 1 and 2, a depth checking device 100 according to an exemplary embodiment includes a hollow cylindrical pressing member 110, a hollow cylindrical body member 120, a cylindrical checking member 130, a fastener such as a screw or an adjustment bolt 140 and an adjustment nut 150. The pressing member 110 receives a portion of the body member 120 therein. The adjustment nut 150 is screwed onto the checking member 130. The checking member 130 is received in the body member 120.

Figure 3:
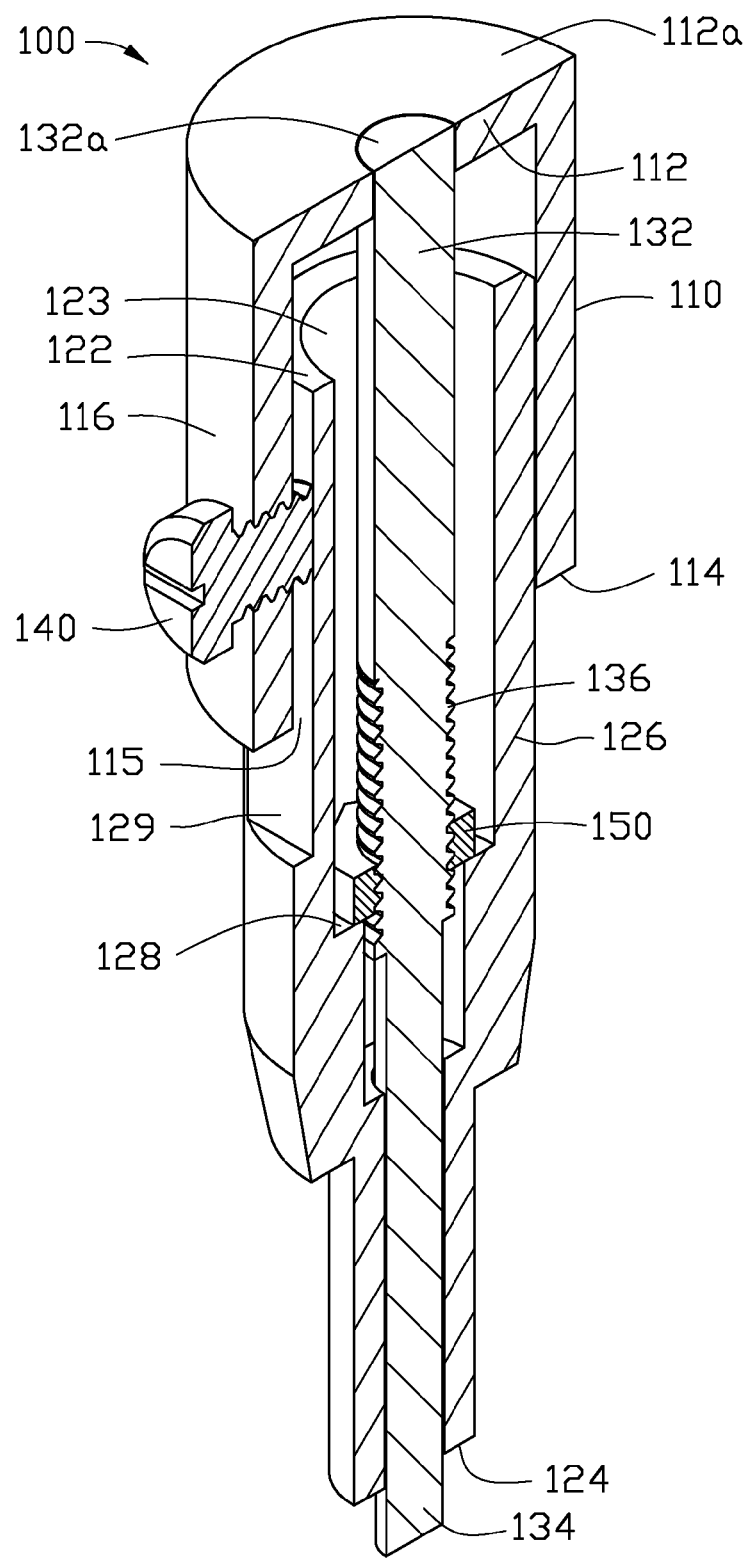
FIG. 3 is an enlarged, cross-sectional view of the depth checking device of FIG. 1.

Referring to FIGS. 2 and 3, the pressing member 110 includes a first end 112, a second end 114 opposite to the first end 112, and a first sidewall 116 connecting the first end 112 to the second end 114. The first end 112 includes a first end surface 112a and defines a first opening 113 in the first end surface 112a. The second end 114 defines a second opening 115 having a diameter greater than that of the first opening 113. The first opening 113 is coaxially communicated with the second opening 115. The first sidewall 116 defines a first threaded through hole 118.

The body member 120 includes a third end 122, a fourth end 124 opposite to the third end 122, and a second sidewall 126 connecting the third end 122 to the fourth end 124. The body member 120 defines a stepped through hole 123 running from the third end 122 to the fourth end 124. A stopping surface 128 is formed inside the stepped through hole 123. A plane surface 129 is formed on the second sidewall 126 and extends parallel to the axis of the stepped through hole 123. The adjustment bolt 140 is screwed into the first threaded through hole 118 until the adjustment bolt 140 abuts against the plane surface 129 so that the pressing member 110 is secured to the body member 120.

The checking member 130 includes an indication end 132 and an opposite probe end 134. The indication end 132 is adjacent to the third end 122 of the body member 120 and includes a second end surface 132a. The probe end 134 is adjacent to the fourth end 124 of the body member 120. External threads 136 are formed on an outer surface portion of the checking member 130. The adjustment nut 150 is engaged with the threads 136, thereby being mounted on the checking member 130. When the checking member 130 extends through the stepped through hole 123, the adjustment nut 150 is stopped and supported by the stopping surface 128 of the body member 120. In this condition, the second end surface 132a of the indication end 132 is substantially coplanar with the first end surface 112a of the first end 112, and the probe end 134 protrudes from the fourth end 124. A protruding length of the probe end 134 is equal to a designed depth of a fixing hole, and can be adjusted by screwing the adjustment nut 150 up or down along the checking member 130. When the protruding length of the probe end 134 is adjusted, in order to keep the second end surface 132a of the indication end 132 substantially coplanar with the first end surface 112a of the first end 112, the adjustment bolt 140 is loosened and the body member 120 may be moved up or down relative to the pressing member 110.

Figure 4:
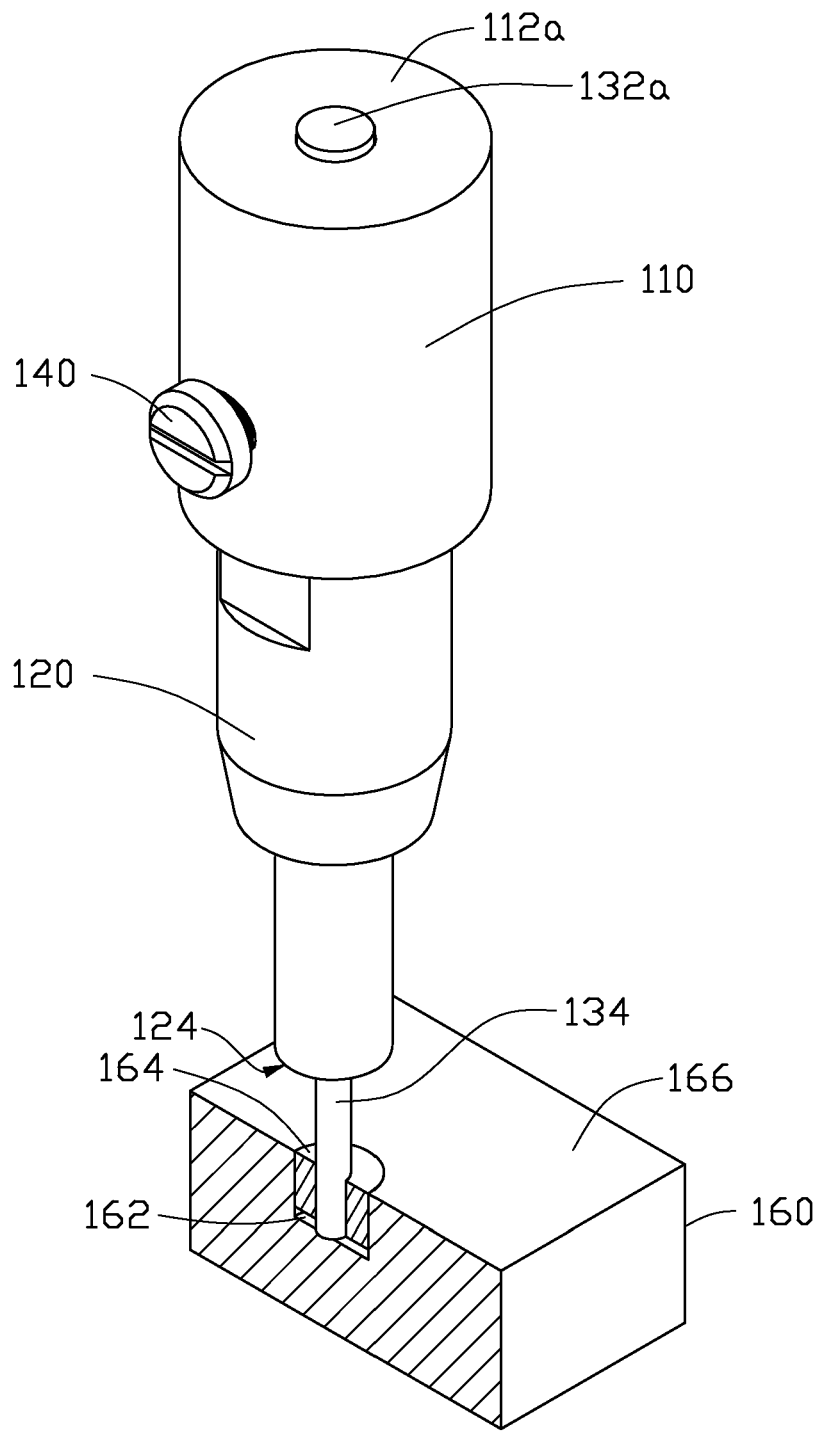
FIG. 4 is a schematic, isometric view of the depth checking device of FIG. 1 in use.

An exemplary process of using the depth checking device 100 to check whether a depth of a fixing hole is less than a designed depth of the fixing hole is described. Referring to FIGS. 2-4, a fixing hole 162 is defined in a plastic workpiece 160 for receiving a fixing nut 164. First, the adjustment nut 150 is screwed up or down along the checking member 130 to a position where the protruding length of the probe end 134 is equal to the designed depth of the fixing hole 162 when the checking member 130 is supported by the stopping surface 128. Second, the adjustment bolt 140 is loosened and the body member 120 is adjusted to a position where the second end surface 132a of the indication end 132 substantially coplanar with the first end surface 112a of the first end 112, then the adjustment bolt 140 is tightened to hold the body member 120 in position. Third, the probe end 134 is inserted into the fixing hole 162. The pressing member 110 together with the body member 120 is moved downwardly until the fourth end 124 of the body member 120 contacts an upper surface 166 of the plastic workpiece 160. If the second end surface 132a is still substantially coplanar with the first end surface 112a, this indicates that the depth of the fixing hole 162 is equal to the designed depth and there is no accumulation of plastic material inside of the fixing hole 162. If the indication end 132 projects beyond the first end surface 112a, this indicates that the depth of the fixing hole 162 is less than the designed depth and there is accumulation of plastic material inside of the fixing hole 162. Thus, checking the depth of the fixing hole 162 is efficient and accurate.

Figure 5:
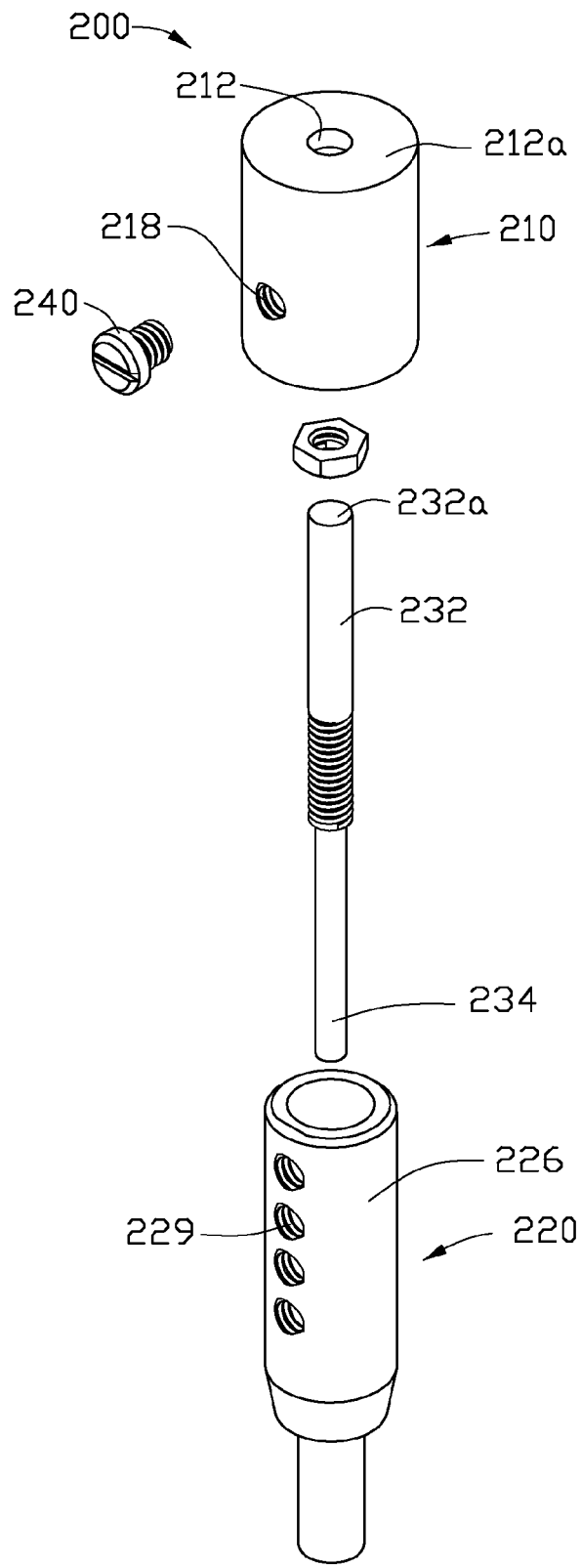
FIG. 5 is an exploded, isometric view of a depth checking device according to another exemplary embodiment.

Referring to FIG. 5, a depth checking device 200 according to another embodiment is shown. The differences between the depth checking device 200 of this embodiment and the depth checking device 100 are that the depth checking device 200 doesn't include the plane surface 129 and the depth checking device 200 further defines a plurality of second threaded through holes 229 on the second sidewall 226. The second threaded through holes 229 are defined along a longitudinal direction of the body member 220. The adjustment bolt 240 is screwed into the first threaded through hole 218 and the second threaded through holes 229 so that the pressing member 210 is secured to the body member 220. When the protruding length of the probe end 234 is adjusted, in order to keep the second end surface 232a of the indication end 232 substantially coplanar with the first end surface 212a of the first end 212, the adjustment bolt 240 is loosened and screwed into the first threaded through hole 218 and the corresponding second threaded through hole 229, thereby the body member 220 may be moved up or down relative to the pressing member 210.

Figure 6:
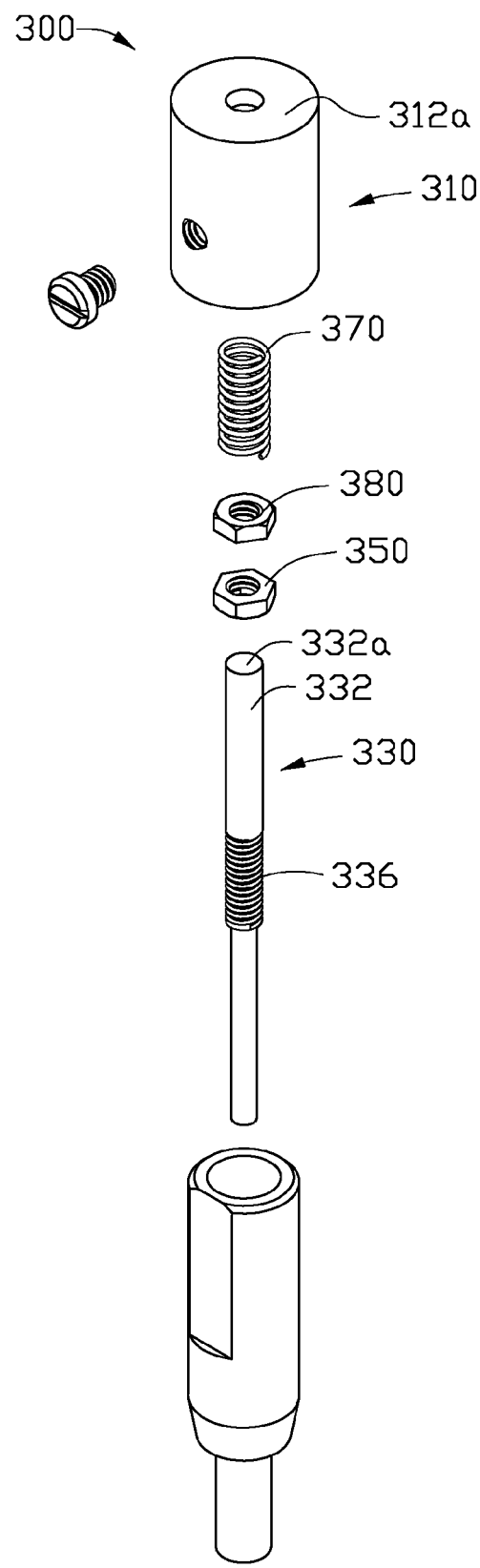
FIG. 6 is an exploded, isometric view of a depth checking device according to a further exemplary embodiment.
Figure 7:
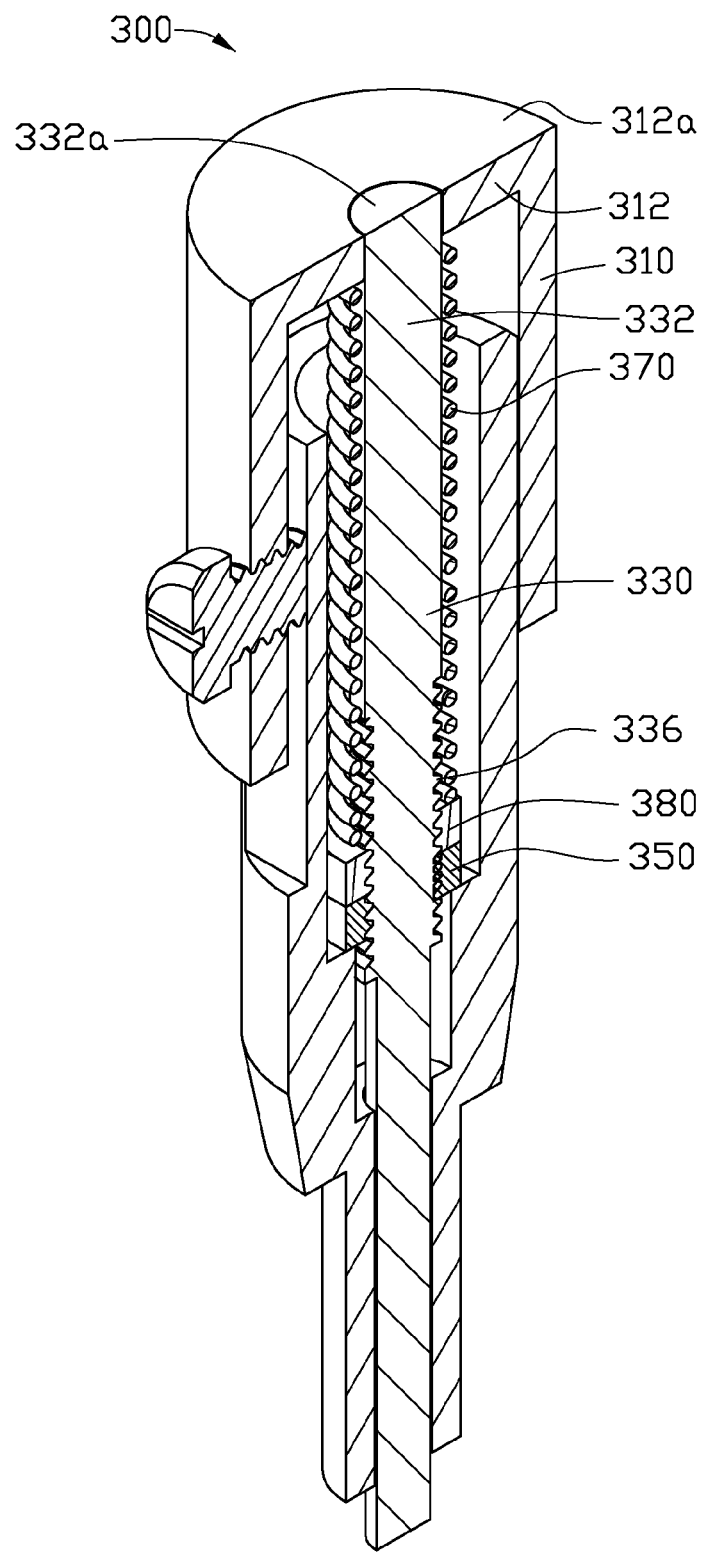
FIG. 7 is a cross-sectional view of the depth checking device of FIG. 6.

Referring to FIGS. 6 and 7, a depth checking device 300 according to a further embodiment is shown. The differences between the depth checking device 300 of this embodiment and the depth checking device 100 are that the depth checking device 300 further includes an elastic element 370 and a heightening nut 380. The heightening nut 380 is engaged with the threads 336 and abuts against the adjustment nut 350. The elastic element 370 is a compression spring and sleeves around the checking member 330 tightly. One end of the elastic element 370 contacts the heightening nut 380 and the other end of the elastic element 370 contacts the first end 312 of the pressing member 310. The heightening nut 380 is configured for decreasing the length of, or compressing, the elastic element 370 thereby decreasing the distance between the adjustment nut 350 and the first end 312.

The elastic element 370 may be compressed between the first end 312 and the heightening nut 380 so as to keep the second end surface 332a of the indication end 332 substantially coplanar with the first end surface 312a of the first end 312 when the depth checking device 300 is not in use.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A depth checking device for checking whether a depth of a fixing hole is less than a designed depth of the fixing hole, the depth checking device comprising:
   a body member defining a stepped through hole and forming a stopping surface inside the stepped through hole;
   a hollow pressing member comprising a first end and an opposite second end, the first end comprising a first end surface, a first opening defined on the first end surface, a second opening defined on the second end, the body member received in the second opening, the first opening, the second opening and the stepped through hole being in communication with each other;
   a checking member moveably mounted in the stepped through hole, the checking member comprising an indication end adjacent to the first end and an opposite probe end, the indication end including a second end surface; and
   an adjustment nut screwed on the checking member and supported by the stopping surface in a position where the first end surface is coplanar with the second end surface and the probe end protruding from the body member with a protruding length of the probe end same as the designed depth of the fixing hole.

2. The depth checking device as claimed in claim 1, wherein the depth checking device further comprises an adjustment bolt, the pressing member further comprises a first sidewall connecting the first end to the second end, a first threaded through hole is defined on the first sidewall, the body member further comprises a second sidewall, a plane surface is formed on the second wall, the pressing member is secured to the body member by the adjustment bolt being screwed into the first threaded through hole until the adjustment bolt abuts against the plane surface.

3. The depth checking device as claimed in claim 1, wherein the depth checking device further comprises an adjustment bolt, the pressing member further comprises a first sidewall connecting the first end to the second end, a first threaded through hole is defined on the first sidewall, the body member further comprises a second sidewall, a plurality of second threaded through holes are defined in a row on the second wall, the pressing member is secured to the body member by the adjustment bolt being screwed into the first threaded through hole and the corresponding second threaded through hole.

4. The depth checking device as claimed in claim 1, wherein external threads are formed on an outer surface portion of the checking member, the adjustment nut is engaged with the threads.

5. The depth checking device as claimed in claim 1, wherein the depth checking device further comprises a heightening nut, external threads are formed on an outer surface portion of the checking member, the adjustment nut is engaged with the threads, and the heightening nut is engaged with the threads, the heightening nut abuts against the adjustment nut.

6. The depth checking device as claimed in claim 5, wherein the depth checking device further comprises an elastic element, the elastic element sleeves around the checking member tightly, one end of the elastic element contacts the heightening nut and the other end of the elastic element contacts the first end of the pressing member.

7. The depth checking device as claimed in claim 6, wherein the elastic element is a compression spring.

* * * * *